United States Patent
Feng et al.

(10) Patent No.: US 9,691,281 B2
(45) Date of Patent: Jun. 27, 2017

(54) NAVIGATION SYSTEM WITH IMAGE ASSISTED NAVIGATION MECHANISM AND METHOD OF OPERATION THEREOF

(75) Inventors: Hongwei Feng, Palo Alto, CA (US); Md Ahsan Habib, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 463 days.

(21) Appl. No.: 12/730,979

(22) Filed: Mar. 24, 2010

(65) Prior Publication Data

US 2011/0238290 A1    Sep. 29, 2011

(51) Int. Cl.
| G01C 21/36 | (2006.01) |
| G08G 1/0969 | (2006.01) |
| G08G 1/16 | (2006.01) |
| G08G 1/0968 | (2006.01) |

(52) U.S. Cl.
CPC ....... G08G 1/0969 (2013.01); G01C 21/3647 (2013.01); G01C 21/3697 (2013.01); G08G 1/166 (2013.01); *G08G 1/096811* (2013.01); *G08G 1/096861* (2013.01)

(58) Field of Classification Search
CPC  G01C 11/06; G01C 21/3602; G01C 21/3647; G01C 21/3697; G08G 1/16; G08G 1/165; G08G 1/166; G06T 7/00976; G06T 2207/30261; G06K 9/00791; G06K 9/00805
USPC ....... 701/400, 408–412, 423, 431, 437, 454, 701/519, 523
See application file for complete search history.

(56) References Cited

U.S. PATENT DOCUMENTS

| 5,375,059 | A | | 12/1994 | Kyrtsos et al. | |
| 5,448,233 | A | | 9/1995 | Saban et al. | |
| 5,640,323 | A | | 6/1997 | Kleimenhagen et al. | |
| 6,026,347 | A | * | 2/2000 | Schuster | B62D 1/28 180/167 |
| 6,243,482 | B1 | | 6/2001 | Eibert et al. | |
| 6,466,865 | B1 | * | 10/2002 | Petzold | 701/538 |
| 6,571,169 | B2 | * | 5/2003 | Miyaki | 701/400 |
| 6,728,635 | B2 | | 4/2004 | Hamada et al. | |
| 7,668,649 | B2 | * | 2/2010 | Onishi | 701/426 |
| 7,733,244 | B2 | * | 6/2010 | Asada | 340/995.1 |
| 7,822,545 | B2 | * | 10/2010 | Kanda et al. | 701/420 |
| 8,024,113 | B2 | * | 9/2011 | Kim et al. | 701/425 |
| 8,200,427 | B2 | * | 6/2012 | Cho et al. | 701/426 |
| 8,255,157 | B2 | * | 8/2012 | Harada | 701/426 |

(Continued)

FOREIGN PATENT DOCUMENTS

JP    11-321494 A  * 11/1999

OTHER PUBLICATIONS

International Search Report for PCT Application No. PCT/US2011/028289 dated May 19, 2011.

(Continued)

*Primary Examiner* — Thomas G Black
*Assistant Examiner* — Ce Li
(74) *Attorney, Agent, or Firm* — IP Investment Law Group (57) ABSTRACT

A method of operation of a navigation system includes: receiving an entry for a destination, a sub-destination, or a combination thereof with the sub-destination located within the destination; receiving a road obstacle image while traveling along a route to reach the destination; generating an operation direction based on the road obstacle image; and generating a destination image representing the destination for displaying on a device.

20 Claims, 6 Drawing Sheets

(56) References Cited

U.S. PATENT DOCUMENTS

| | | | |
|---|---|---|---|
| 2001/0040505 A1* | 11/2001 | Ishida et al. | 340/435 |
| 2002/0049533 A1* | 4/2002 | Kusano et al. | 701/209 |
| 2002/0087269 A1* | 7/2002 | Sasaki et al. | 701/301 |
| 2002/0133289 A1* | 9/2002 | Miyaki | 701/200 |
| 2005/0085999 A1* | 4/2005 | Onishi | 701/211 |
| 2005/0137756 A1* | 6/2005 | Takahashi | 701/1 |
| 2005/0182564 A1* | 8/2005 | Kim | 701/211 |
| 2006/0155466 A1* | 7/2006 | Kanda et al. | 701/209 |
| 2007/0021915 A1 | 1/2007 | Breed et al. | |
| 2007/0154068 A1* | 7/2007 | Stein et al. | 382/106 |
| 2007/0155406 A1* | 7/2007 | Dowling et al. | 455/456.1 |
| 2007/0225910 A1* | 9/2007 | Fujiwara | 701/211 |
| 2007/0233370 A1* | 10/2007 | Asada | 701/208 |
| 2008/0170118 A1 | 7/2008 | Albertson et al. | |
| 2009/0032326 A1* | 2/2009 | Kim et al. | 180/313 |
| 2009/0160803 A1* | 6/2009 | Hashimoto | 345/173 |
| 2010/0070173 A1* | 3/2010 | Sakamoto | 701/209 |
| 2010/0125407 A1* | 5/2010 | Cho et al. | 701/201 |
| 2010/0191391 A1* | 7/2010 | Zeng | 701/1 |
| 2010/0226544 A1* | 9/2010 | Uchida et al. | 382/107 |
| 2010/0250113 A1* | 9/2010 | Miyata | 701/201 |

OTHER PUBLICATIONS

Colbry et al., Detection of Anchor Points for 3D Face Verification, 8 pages, Michigan State University, East Lansing, Michigan 48824-1226.

Leibe et al., Analyzing Appearance and Contour Based Methods for Object Categorization, 7 pages, Proc. IEEE Conference on Computer Vision and Pattern Recognition (CVPR'03), Madison, USA, Jun. 2003, Perceptual Computing and Computer Vision Group, ETH Zurich, Switzerland.

* cited by examiner

NAVIGATION SYSTEM WITH IMAGE ASSISTED NAVIGATION MECHANISM AND METHOD OF OPERATION THEREOF

TECHNICAL FIELD

The present invention relates generally to a navigation system, and more particularly to a system for navigation system with image.

BACKGROUND ART

Modern portable consumer and industrial electronics, especially client devices such as navigation systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system that cannot provide precise navigation guidance for the user to avoid obstacles on the road has become a paramount concern for the consumer. A navigation system without precise navigation guidance can lead to unsafe operation of the vehicle and can decrease the benefit of using the tool.

Thus, a need still remains for a navigation system with image assisted navigation mechanism to give precise navigation guidance to avoid obstacles on the road. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving an entry for a destination, a sub-destination, or a combination thereof with the sub-destination located within the destination; receiving a road obstacle image while traveling along a route to reach the destination; generating an operation direction based on the road obstacle image; and generating a destination image representing the destination for displaying on a device.

The present invention provides a navigation system, including: an entry module for receiving an entry for a destination, a sub-destination, or a combination thereof with the sub-destination located within the destination; an image receiver module, coupled to the entry module, for receiving a road obstacle image while traveling along a route to reach the destination; a guidance generator module, coupled to the image receiver module, for generating an operation direction based on the road obstacle image; and an image management module, coupled to the image receiver module, for generating a destination image representing the destination for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
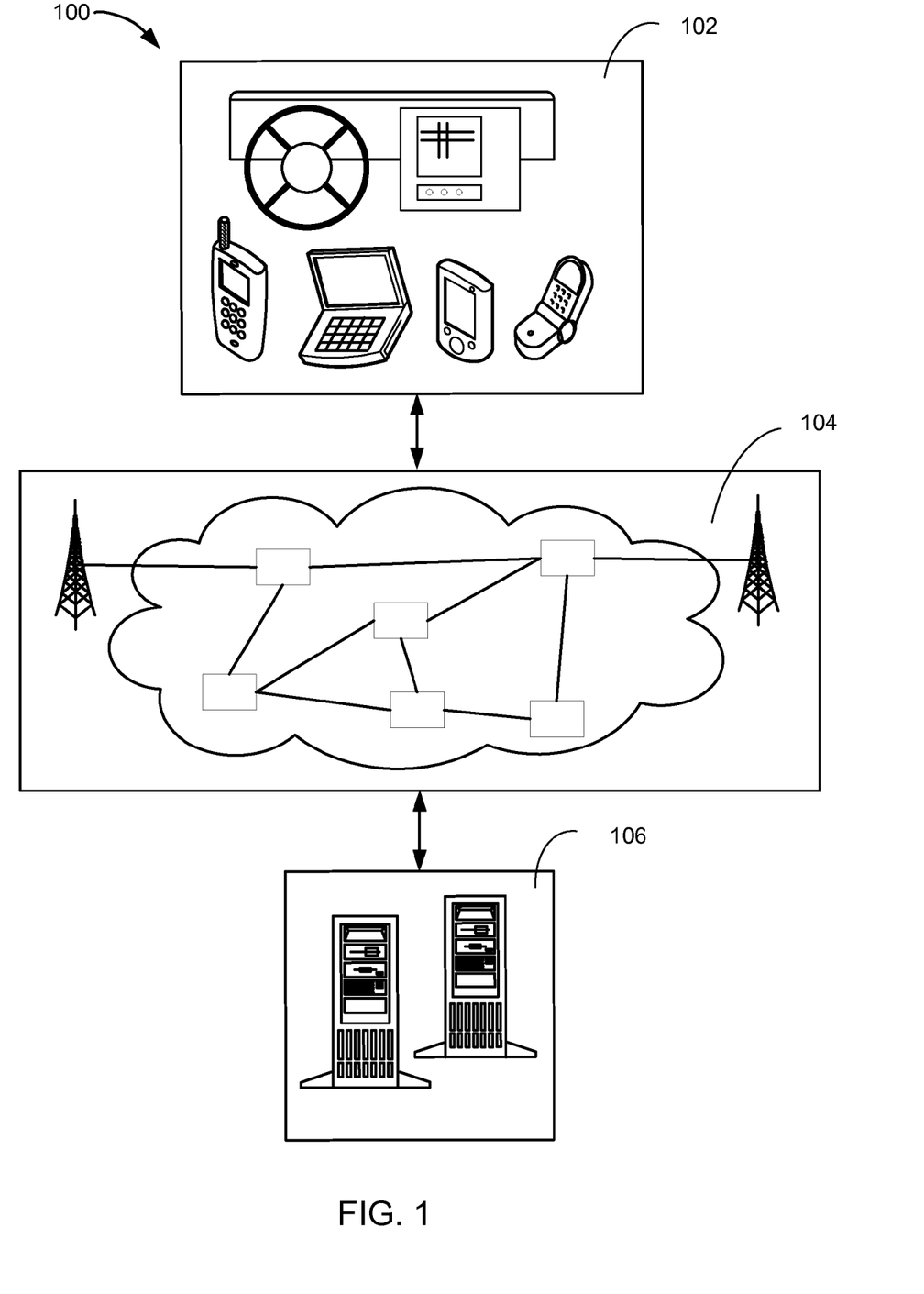
FIG. 1 is a navigation system with image assisted navigation mechanism in a first embodiment of the present invention.

Referring now to FIG. 1, therein is shown a navigation system 100 with image assisted navigation mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
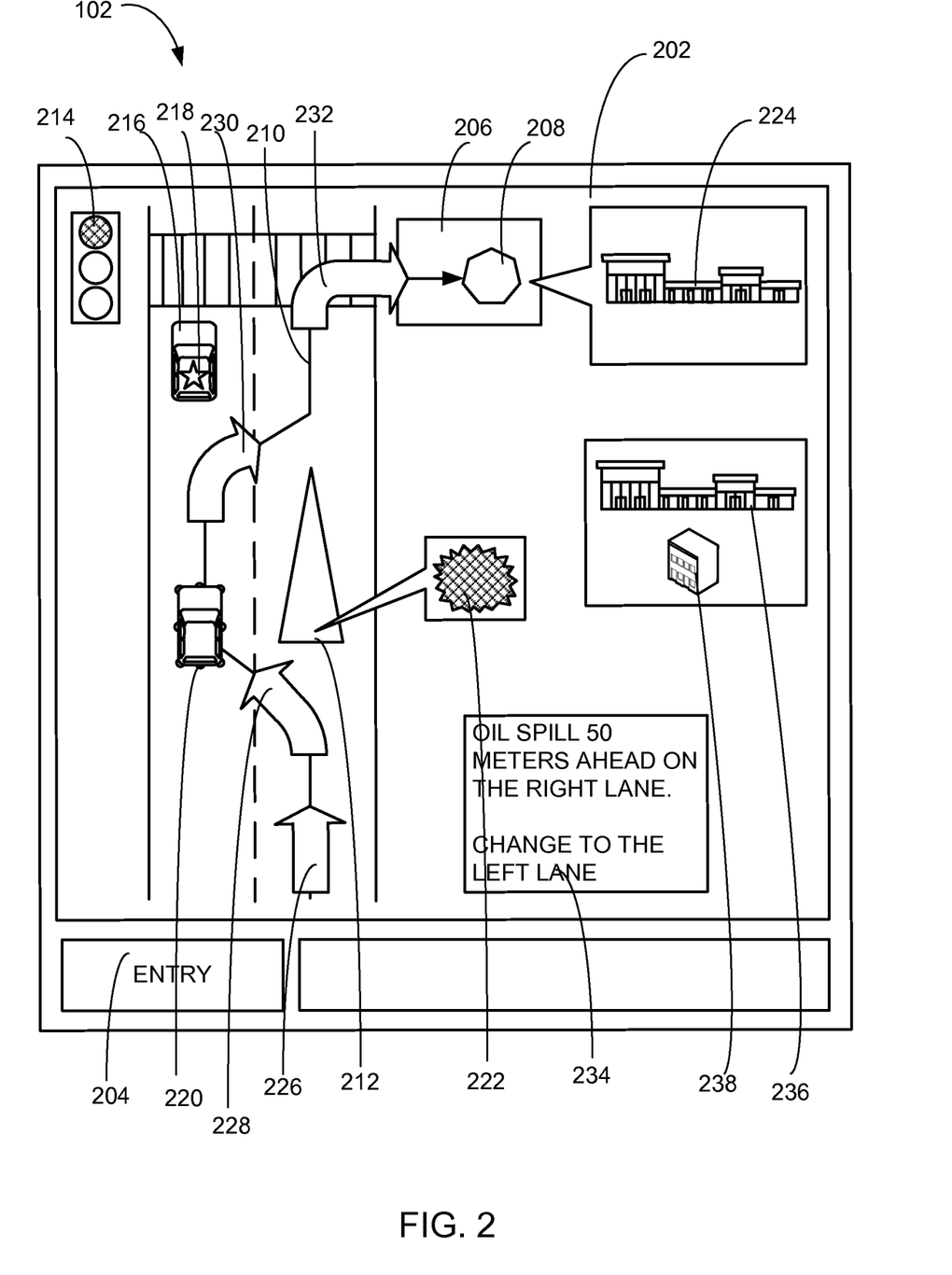
FIG. 2 shows an example of a display interface of the first device.

Referring now to FIG. 2, therein is shown an example of a display interface 202 of the first device 102. The first device 102 can receive an entry 204 for the user's target destination. For example, the entry 204 can include a destination 206, a sub-destination 208, or a combination thereof.

The destination 206 represents the target destination where the user intends to reach at the end of the user's travel. For example, the destination 206 can represent a shopping mall, a bank, a hospital, or other points of interest.

The destination 206 can include the sub-destination 208. The sub-destination 208 represents a location of finer granularity than and within the destination 206 and the ultimate destination for the user of the navigation system 100. For example, the Apple store can be the sub-destination 208. The Apple store can be within the shopping mall, which can be the destination 206 having the sub-destination 208 as the Apple store. As a different example, the immunization department within a hospital can be the sub-destination 208. The immunization department can be on the third floor of the hospital, which can be the destination 206 having the sub-destination 208 as the immunization department.

The display interface 202 can display a route 210. The route 210 represents the travel route that the user of the navigation system 100 can take to reach the destination 206, the sub-destination 208, or the combination thereof.

The display interface 202 can display a road obstacle 212. The road obstacle 212 is defined as an entity or object that is tangible, visible, or a combination thereof that can impact the user's travel to reach the destination 206. For example, the road obstacle 212 can include debris, spills, or a stalled vehicle on the route 210. As a more specific example, the road obstacle 212 can be stationary or moving.

The road obstacle 212 can include a traffic controller 214 that can control the flow of the traffic along the route 210. For example, the traffic controller 214 can represent colors red, yellow, or green of a traffic light to signify whether the user can proceed with the travel along the route 210 to reach the destination 206. As a different example, the traffic controller 214 can represent "STOP" of a stop sign to signify the user to stop the vehicle proceeding.

The road obstacle 212 can include a moving obstacle 216. For example, the moving obstacle 216 can represent other vehicles that are traveling along the same road as the user. As a different example, the moving obstacle 216 can also represent debris, such as tumbleweed, that can move around the road.

The display interface 202 can display a tracking tag 218. The tracking tag 218 represents a tracking device to track the movement of the moving obstacle 216. For example, the navigation system 100 can track a particular vehicle other than the user's vehicle by following the tracking tag 218.

The navigation system 100 can use an image capturing device 220 to capture images of the environment surrounding the user's vehicle while traveling along the route 210. The image capturing device 220 represents a device that captures still or streaming images. For example, the image capturing device 220 can include a digital camera on glasses, video camera on a vehicle, or a combination thereof to capture a still digital image, a streaming video, or a combination thereof. The image capturing device 220 can capture a road obstacle image 222, a target destination image 224, or a combination thereof.

The road obstacle image 222 represents an image captured by the image capturing device 220 of the road obstacle 212. For example, the road obstacle image 222 can include a still digital image of the traffic controller 214 being red. As a different example, the road obstacle image 222 can include a streaming video of the moving obstacle 216, such as a vehicle other than the user's vehicle, traveling on the road. The target destination image 224 represents an image captured by the image capturing device 220 of the destination 206.

The display interface 202 can display operation directions 226. The operation directions 226 represent the recommendation for operating the vehicle presented by the navigation system 100 for the user to follow to reach the destination 206 safely. For example, the operation directions 226 can be a text that can be displayed on the display interface 202, an audio recommendation, a visual recommendation, a tactile recommendation, or a combination thereof.

The operation directions 226 can include a first operation direction 228, a second operation direction 230, and a third operation direction 232. The designation of "first," "second," and "third" are for convenience and not intended to be limit the present invention to the strict order described in the following example. The first operation direction 228, the second operation direction 230, and the third operation direction 232 are further examples of the operation directions 226, and have the same characteristics as the operation directions 226.

For example, the first operation direction 228 can represent a recommendation for the user to change the lane to the left lane by the navigation system 100 to avoid the road obstacle 212, such as an oil spill, on the right lane of the road. As a different example, the second operation direction 230 can represent a recommendation for the user to change the lane to the right lane by the navigation system 100 to avoid the moving obstacle 216, such as another vehicle other than the user's vehicle, on the left lane traveling along the road. As another example, the third operation direction 232 can represent a recommendation for the user by the navigation system 100 to turn right at the exit of the road to enter the destination 206.

The operation directions 226 can include a warning 234. The warning 234 represents a notice to alarm the user of the road obstacle 212 along the route 210. For example, the warning 234 can alarm the user of an oil spill on the right lane of the road.

The display interface 202 can display a destination image 236. The destination image 236 represents an image of the destination 206 generated by the navigation system 100. For example, the destination image 236 can include a still digital image, a streaming video, or a combination thereof. As a more specific example, the destination image 236 can be the image of the shopping mall or the front of the point of interest.

The display interface 202 can display a sub-destination image 238. The sub-destination image 238 represents an image of the sub-destination 208 generated by the navigation system 100. For example, the sub-destination image 238 can include a still digital image, a streaming video, or a combination thereof. As a more specific example, the sub-destination image 238 can be the image of the Apple store inside the shopping mall. As a different specific example, the sub-destination image 238 can be an image of a surrounding environment of the sub-destination 208. The image of a surrounding environment can include images of stores adjacent to the Apple store.

Figure 3:
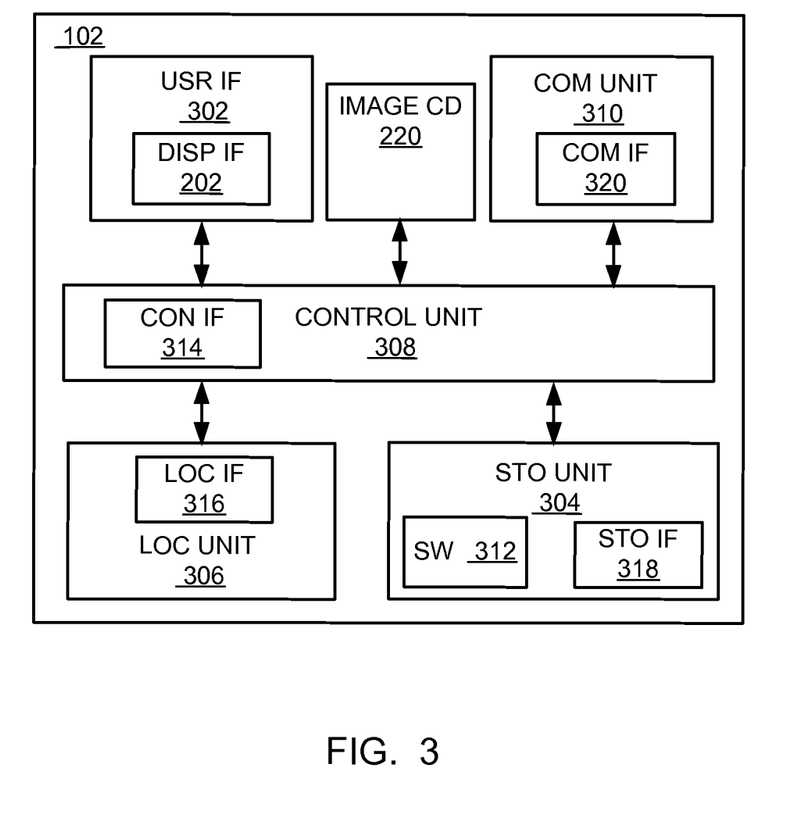
FIG. 3 is an exemplary block diagram of the first device.

Referring now to FIG. 3, therein is shown an exemplary block diagram of the first device 102. The first device 102 can include a user interface 302, the image capturing device 220, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The image capturing device 220 can capture images surrounding the vehicle. The image capturing device 220 can capture images in the format of still image, streaming video or the combination thereof. Examples of the image capturing device 220 can include a digital camera, video camera, thermal camera, night vision camera, infrared camera, x-ray camera, or the combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
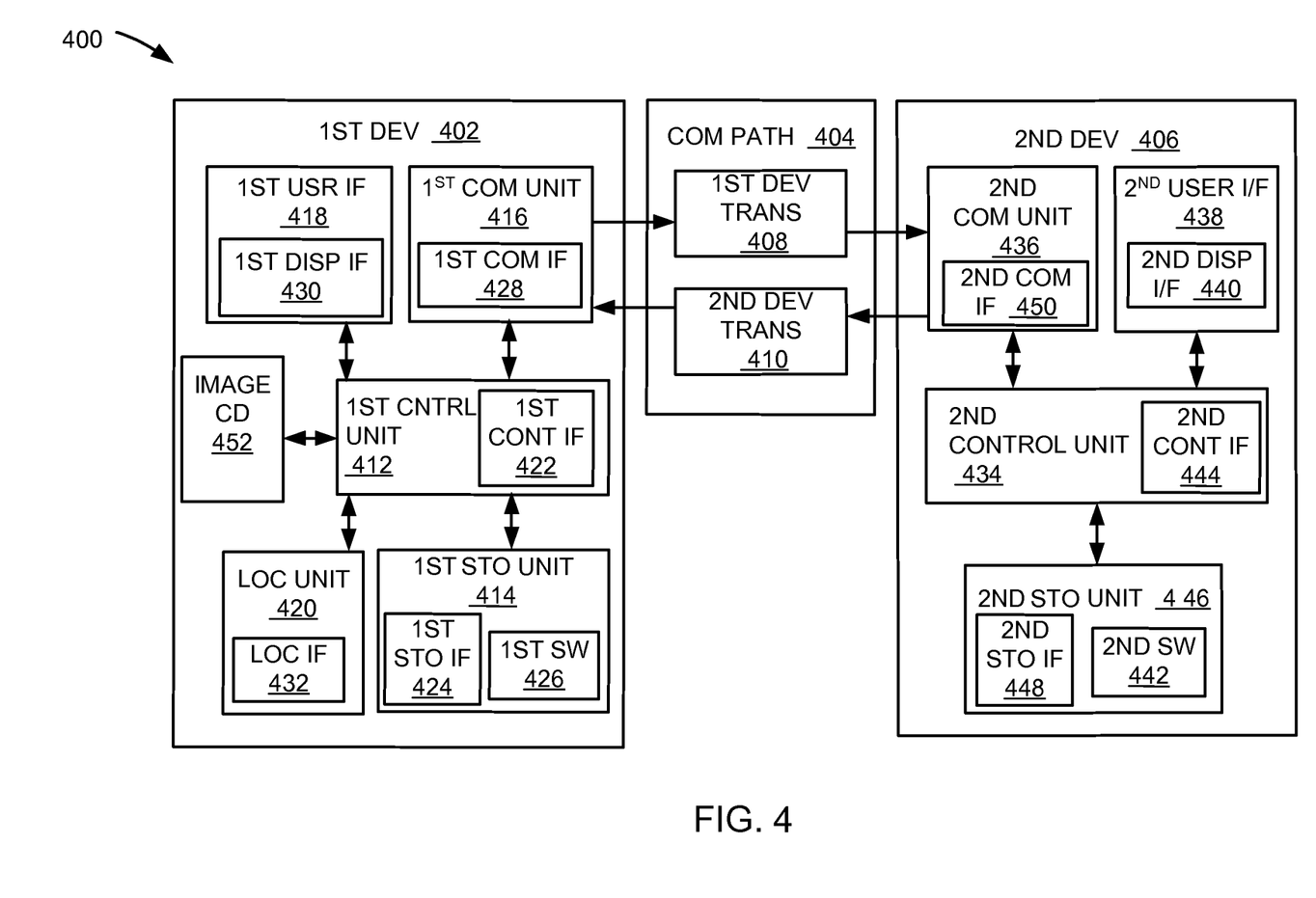
FIG. 4 is an exemplary block diagram of a navigation system with image assisted navigation mechanism in a second embodiment of the present invention.

Referring now to FIG. 4, therein is shown an exemplary block diagram of a navigation system 400 with image assisted navigation mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, an image capturing device 452, and a location unit 420. The first device 402 can be similarly described by the first device 102.

The first control unit 412 can include a first control interface 422. The first control unit 412 and the first control interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively. The image capturing device 452 can be similarly described as the image capturing device 220 of FIG. 3.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
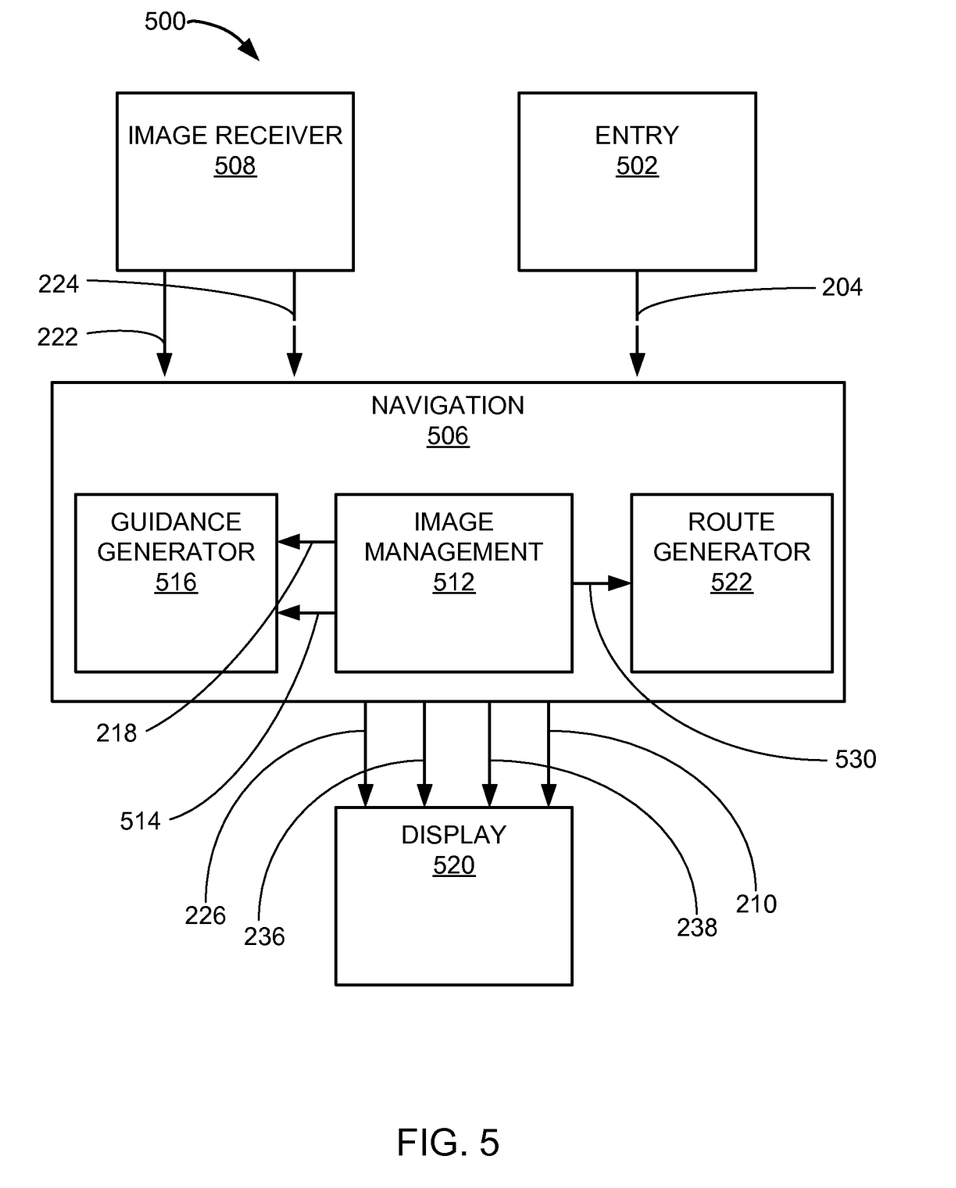
FIG. 5 is a navigation system with image assisted navigation mechanism in a third embodiment of the present invention.

Referring now to FIG. 5, therein is shown a navigation system 500 with image assisted navigation mechanism in a third embodiment of the present invention. The navigation system 500 can include an entry module 502. The entry module 502 receives the entry 204 of FIG. 2 for the navigation system 500 to generate and display a travel path to reach the target destination. For example, the entry module 502 can receive the entry 204 for the destination 206 of FIG. 2, the sub-destination 208 of FIG. 2, or a combination thereof with the sub-destination 208 located within the destination 206.

The entry module 502 can receive the entry 204 in a number of ways. For example, the entry module 502 can receive the entry 204 as a manually typed entry, a selection from a list, a voice entry, or the combination thereof. As a specific example, the entry module 502 can receive the entry 204 for the hospital as the entry 204 for the destination 206. Continuing with the example, the entry module 502 can receive the entry 204 for the immunization department on the third floor of the hospital as the entry 204 for the sub-destination 208.

The entry module 502 can receive the entry 204 from an automatic entry. For example, the navigation system 500 can include a calendar system. The user can schedule a pickup of a gift from a store in the shopping mall at 3 PM on the calendar system. While the driver is driving around 2:30 PM, the calendar system can automatically send the name of the store in the shopping mall to the entry module 502 as the entry 204 for the sub-destination 208. The entry module 502 can send the entry 204 to a navigation module 506.

The navigation system 500 can include an image receiver module 508. The image receiver module 508 receives the image captured by the image capturing device 220 of FIG. 2 while the user travels along the travel path. For example, the image receiver module 508 can receive the road obstacle image 222 of FIG. 2 captured by the image capturing device 220. As a more specific example, the image receiver module 508 can receive the road obstacle image 222 while traveling along the route 210 to reach the destination 206.

The image capturing device 220 and the image receiver module 508 can be connected wirelessly. For example, the wireless connection can include satellite communication, cellular communication, Bluetooth, Infrared Data Association standard (IrDA), wireless fidelity (WiFi), and worldwide interoperability for microwave access (WiMAX).

The image capturing device 220 and the image receiver module 508 can be connected with wired connection. For example, the wired connection can include Ethernet, digital subscriber line (DSL), fiber to the home (FTTH), and plain old telephone service (POTS). The image capturing device 220 can send the road obstacle image 222 to the image receiver module 508.

The image receiver module 508 can receive the road obstacle image 222 in a number of ways. For example, the image capturing device 220 can be a digital camera on the user's glasses. The image capturing device 220 can capture a digital photograph of the road obstacle 212 of FIG. 2 representing an oil spill as the road obstacle image 222. The image receiver module 508 can receive the road obstacle image 222 for representing the road obstacle 212 encountered while traveling along the route 210 from the image capturing device 220.

As a different example, the image capturing device 220 can be a digital video recorder placed on the user's vehicle. The image capturing device 220 can record a video stream of the moving obstacle 216 of FIG. 2 representing a vehicle other than the user's vehicle as the road obstacle image 222. The image receiver module 508 can receive the road obstacle image 222 from the image capturing device 220 that represents the moving obstacle 216 while traveling along the route 210. The image receiver module 508 can send the road obstacle image 222 to the navigation module 506.

The navigation system 500 can include the navigation module 506. The navigation module 506 generates a recommendation for the user to safely travel along the travel path. For example, the navigation module 506 can generate the operation directions 226 of FIG. 2 based on the road obstacle image 222 for the user to safely travel along the route 210. The details regarding the navigation module 506 generating the operation directions 226 will be discussed later.

The navigation module 506 can include an image management module 512. The image management module 512 analyzes the image received by the image receiver module 508. Based on the analysis, the navigation module 506 can recommend the user to travel safely along the route 210. For example, the image management module 512 can analyze the road obstacle image 222 sent by the image receiver module 508.

The image management module 512 can analyze the road obstacle image 222 in a number of ways. For example, the image management module 512 can perform an image recognition algorithm to identify the image. Some examples of the image recognition algorithm can include a contour and shape based object recognition method, an appearance-based object recognition method, and anchor point detection algorithm.

As a specific example, the image management module 512 can include a database that stores images to compare the road obstacle image 222 against. The road obstacle image 222 can be an image of an oil spill on the road. The image management module 512 can store digital images of an oil spill on the road. The image management module 512 can perform the image recognition algorithm by comparing the color, the texture cue, the shape, the contour, anchoring points, or the combination thereof of the road obstacle image 222 to the stored images to identify that the road obstacle image 222 is an image of an oil spill on the road.

Continuing with the example, the image management module 512 can determine how far the oil spill is from the user's vehicle and how large the oil spill on the road is by performing the image recognition algorithm. As a specific example, the image capturing device 220 can take multiple images of the road obstacle image 222 as the user travels along the route 210. The image management module 512 can assign anchoring points to the each images of the road obstacle image 222 representing the oil spill.

The road obstacle image 222 representing the oil spill can increase in size as the user's vehicle nears the oil spill. In proportion to the increase in size of the road obstacle image 222, the distance between anchoring points on the road obstacle image 222 can also increase from one image to another. The image management module 512 can determine how far or how large is the oil spill by comparing the multiple images of the oil spill to each other. Based on the rate of increase for the distances between the anchoring points of one image to another, the speed of the user's vehicle traveling along the route 210, and the current location of the user's vehicle, the image management module 512 can determine how far the oil spill is from the user's vehicle and how big the oil spill is.

As a different example, the road obstacle image 222 can be an image of the traffic controller 214 of FIG. 2 being red. The image management module 512 can store digital images of the traffic controller 214 being red. The image management module 512 can perform the image recognition algorithm by comparing the color, the shape, the anchoring points, or the combination thereof of the traffic controller in the road obstacle image 222 to the stored image for identifying the color of the traffic controller 214.

For another example, the road obstacle image 222 can be a video stream of the moving obstacle 216. The moving obstacle 216 can represent a blue sports car. The image management module 512 can store digital images of the blue sports car.

The image management module 512 can convert the video stream into digital still images using a streaming-video-to-still-image algorithm. Some examples of streaming-video-to-still-image algorithms are Windows Image Acquisition™, VidEdit™, and AVIRIP™.

The image management module 512 can convert the video stream of the blue sports car into still images of the blue sports car by performing the streaming-video-to-still-image algorithm. The image management module 512 can perform the image recognition algorithm by comparing the color, the shape, the anchoring points, or the combination thereof of the still images that were converted from the video stream to the stored images to identify that the moving obstacle 216 is a blue sports car.

As described in the previous example for the road obstacle image 222 representing an oil spill, the image management module 512 can perform the image recognition algorithm to determine how far and how fast the blue sports car is traveling relative to the user's vehicle. The image management module 512 can send the road obstacle image 222 analyzed by the image management module 512 as an analyzed obstacle image 514 to a guidance generator module 516. The analyzed obstacle image 514 represents the information of the road obstacle 212 that includes the type of the road obstacle 212, the distance of the road obstacle 212 from the user's vehicle, the size of the road obstacle 212, the speed of the moving obstacle 216, or the combination thereof.

For illustrative purposes, the navigation system 500 is described with the image management module 512 analyzing the context of the road obstacle image 222 to compare against the images stored in the image management module 512, although it is understood that the navigation system 500 can operate the image management module 512 differently. For example, the image management module 512 can generate the tracking tag 218 of FIG. 2 for tracking the moving obstacle 216 while traveling along the route 210.

The image management module 512 can generate the tracking tag 218 in a number of ways. For example, the image management module 512 can generate the tracking tag 218 based on performing the image recognition algorithm. As a more specific example, the image management module 512 can generate the tracking tag 218 based on tracking the anchoring points assigned to the images of the moving obstacle 216.

The moving obstacle 216 can be a sports utility vehicle traveling on the same road as the user. As discussed earlier in identifying the moving obstacle 216 by performing the image recognition algorithm, the image management module 512 can assign anchoring points to the multiple images of the road obstacle image 222 representing the sports utility vehicle.

For tracking the sports utility vehicle, the image capturing device 220 can capture the road obstacle image 222 repeatedly. Subsequently, the image management module 512 can assign anchoring points to the road obstacle image 222 as the image capturing device 220 captures the road obstacle image 222. The image management module 512 can generate the tracking tag 218 by tracking the changes between the distances between one set of anchoring points to another on the road obstacle image 222 in one image to another. By tracking the changes of the distances of one set of anchoring points to another, the image management module 512 can track how far and how fast the moving obstacle 216 is traveling relative to the user's vehicle.

As a different example, the image management module 512 can generate the tracking tag 218 based on tracking the color and the texture cue of the moving obstacle 216. The moving obstacle 216 can be a sports utility vehicle with a white California license plate and letters "1ABC234." As discussed earlier, by performing the image recognition algorithm, the image management module 512 can identify the license plate of the vehicle as California license plate and the letters on the license plate as "1ABC234." The image capturing device 220 can repeatedly capture the road obstacle image 222 of the sports utility vehicle with the particular license plate. The image management module 512 can generate the tracking tag 218 by repeatedly identifying the license plate and the letters on the license plate of the sports utility vehicle. The image management module 512 can send the tracking tag 218 to the guidance generator module 516.

The navigation module 506 can include the guidance generator module 516. The guidance generator module 516 generates a recommendation for the user to travel along the travel path safely. For example, the guidance generator module 516 can generate the operation directions 226 based on the analyzed obstacle image 514, the tracking tag 218, or the combination thereof.

The guidance generator module 516 can generate the operation directions 226 in a number of ways. For example, the guidance generator module 516 can generate the warning 234 of FIG. 2 based on the road obstacle image 222 for maneuvering around the road obstacle 212 while traveling along the route 210. As a specific example, the analyzed obstacle image 514 can indicate that there is an oil spill on the right lane 50 meters ahead from the user's current position along the route 210. The guidance generator module 516 can generate the warning 234 to notify the details regarding the road obstacle 212. The guidance generator module 516 can generate the first operation direction 228 to recommend the user to change lane to the left lane of the road.

As a different example, the guidance generator module 516 can generate the operation directions 226 to notify the user of the best timing for the user to change the lane on the road. The warning 234 can indicate that the oil spill is 100 meters long. The guidance generator module 516 can generate the second operation direction 230 of FIG. 2 to delay the user from changing back to the right lane after encountering the oil spill.

As another example, the guidance generator module 516 can generate the operation directions 226 based on the road obstacle image 222 for representing the traffic controller 214 for aiding a user for traveling along the route 210. The user can be colorblind, who cannot tell the difference between the colors green and red. The guidance generator module 516 can generate the warning 234 to inform the user that the traffic controller 214 is currently red. The guidance generator module 516 can generate the third operation direction 232 of FIG. 2 to recommend the timing for the user to turn right when the traffic controller 214 changes to green.

As a different example, the guidance generator module 516 can generate the operation directions 226 based on the road obstacle image 222 for maneuvering around the road obstacle 212 while traveling along the route 210. The road obstacle 212 can be the moving obstacle 216 representing a vehicle. The vehicle can be traveling on the right lane relative to the user's vehicle. The guidance generator module 516 can generate the second operation direction 230 to recommend the best timing for the user to change back to the right lane safely while traveling along the route 210 with other vehicles are also traveling on the road.

As another example, the guidance generator module 516 can generate the operation directions 226 based on the tracking tag 218. The image management module 512 can tag the tracking tag 218 on a sports utility vehicle traveling on the left lane to the user's vehicle. The traffic condition of the road where the user is traveling can be a traffic jam. The tracking tag 218 can indicate that the sports utility vehicle is distancing from the user's vehicle. The tracking tag 218 can indicate that the flow of traffic on the left lane is faster than the traffic on the right lane of the road. The guidance generator module 516 can generate the first operation direction 228 to recommend the user to change to the left lane to enjoy the faster traffic flow of the left lane of the road.

For illustrative purposes, the navigation system 500 is described with the guidance generator module 516 generating the operation directions 226, although it is understood that the navigation system 500 can operate the guidance generator module 516 differently. For example, the guidance generator module 516 can update the operation directions 226 for maneuvering around the road obstacle 212 represented by the road obstacle image 222.

For example, the image capturing device 220 can initially capture the road obstacle image 222 representing an oil spill on the right lane. The guidance generator module 516 can initially generate the operation directions 226 for the user to change lane to the left lane to avoid the oil spill. The image capturing device 220 can recapture the road obstacle image 222. The new image for the road obstacle image 222 can represent a water spill rather than an oil spill. The guidance generator module 516 can update the operation directions 226 by recommending to the user that traveling along the right lane poses no hazard for the user. The guidance generator module 516 can send the operation directions 226 to a display module 520.

For illustrative purposes, the navigation system 500 is described with the navigation module 506 generating the operation directions 226, although it is understood that the navigation system 500 can operate the navigation module 506 differently. For example, the navigation module 506 can generate a travel path for the use to reach the target destination. For a further example, the navigation module 506 can generate the route 210 to reach the destination 206.

The navigation module 506 can generate the route 210 in a number of ways. For example, the navigation module 506 can include a route generator module 522. The route generator module 522 can generate the route 210 based on the entry 204. The entry 204 can be a shopping mall. The route generator module 522 can generate the route 210 to reach the shopping mall. The route generator module 522 can send the route 210 to the display module 520.

For illustrative purposes, the navigation system 500 is described with the image management module 512 analyzing the road obstacle image 222 of the road obstacle 212 to generate the analyzed obstacle image 514, although it is understood that the navigation system 500 can operate the image management module 512 differently. For example, the image management module 512 can generate a visual image of the target destination when the user arrives at the target destination. The image management module 512 can generate the destination image 236 of FIG. 2 representing the destination 206 for displaying on the device 102.

The image management module 512 can generate the destination image 236 in a number of ways. For example, the image capturing device 220 can capture the image of the destination 206 upon arriving at the destination 206 as the target destination image 224. The destination 206 can be a shopping mall. The image receiver module 508 can receive the target destination image 224 representing a shopping mall from the image capturing device 220.

The image management module 512 can generate the destination image 236 based on the target destination image 224. For example, the image management module 512 can send the destination image 236 to the display module 520.

For illustrative purposes, the navigation system 500 is described with the image management module 512 generating the destination image 236, although it is understood that the navigation system 500 can operate the image management module 512 differently. For example, the image management module 512 can generate the sub-destination image 238 of FIG. 2 based on the destination image 236 for identifying the sub-destination 208 of FIG. 2.

The image management module 512 can generate the sub-destination image 238 in a number of ways. For example, the entry 204 for the sub-destination 208 can be the Apple store in the shopping mall. The image management module 512 can generate the destination image 236 of a shopping mall. The database for the image management module 512 can store images for various shops within the shopping mall including the Apple store.

Based on the destination image 236, the image management module 512 can identify that the user has arrived at the correct shopping mall where the Apple store that the user seeks exists. The image management module 512 can generate the sub-destination image 238 representing the Apple store based on the entry 204, the stored image of the Apple store, and the destination image 236. The image management module 512 can send the sub-destination image 238 to the display module 520.

For illustrative purposes, the navigation system 500 is described with the route generator module 522 generating the route 210 to reach the destination 206, although it is understood that the navigation system 500 can operate the route generator module 522 differently. For example, the route generator module 522 can generate the route 210 based on the target destination image 224 to reach the sub-destination 208.

The route generator module 522 can generate the route 210 to reach the sub-destination 208 in a number of ways. For example, the entry 204 for the sub-destination 208 can be the Apple store. The image management module 512 can receive the target destination image 224 of the shopping mall from the image receiver module 508. By performing the image recognition algorithm on the target destination image 224, the image management module 512 can identify that a user's location 530 is currently located on the west end of the shopping mall. The user's location 530 represents the current location of the user relative to the destination 206, the sub-destination 208, or the combination thereof based on the target destination image 224. The image management module 512 can send the user's location 530 to the route generator module 522.

For a more specific example, the database for the route generator module 522 can store a map of the shopping mall. Based on the shopping mall map, the user's location 530, and the entry 204, the route generator module 522 can generate the route 210 to reach the sub-destination 208. As a further example, the Apple store can locate on the east end of the shopping mall. The route generator module 522 can generate the route 210 from the west end of the shopping mall to the Apple store inside the shopping mall. The route generator module 522 can send the route 210 to the display module 520.

For illustrative purposes, the navigation system 500 is described with the guidance generator module 516 generating the operation directions 226 based on the road obstacle image 222 for maneuvering around the road obstacle 212, although it is understood that the navigation system 500 can operate the guidance generator module 516 differently. For example, the guidance generator module 516 can generate the operation directions 226 based on the target destination image 224 for aiding the user to reach the sub-destination 208.

The guidance generator module 516 can generate the operation directions 226 based on the target destination image 224 in a number of ways. For example, the target destination image 224 can indicate the current location of the user relative to the destination 206. The user can be traveling along the road that is at the west end of the shopping mall. The guidance generator module 516 can generate the third operation direction 232 to notify the user to make a right turn to enter the shopping mall parking lot. The sub-destination 208, the Apple store, can be at the east end of the shopping mall. The guidance generator module 516 can generate the operation directions 226 to recommend the user to head east to reach the sub-destination 208. The guidance generator module 516 can send the operation directions 226 to the display module 520.

The navigation system 500 can include the display module 520. The display module 520 can display the outputs generated by the navigation module 506. For example, the display module 520 can display the operation directions 226, the route 210, the destination image 236, the sub-destination image 238, or the combination thereof on the display interface 202.

The physical transformation from generating the operation directions 226 results in movement in the physical world, such as people using the first device 102 of FIG. 1, the first device 402 of FIG. 4, the vehicle, or a combination thereof, based on the operation of the navigation system 500. As the movement in the physical world occurs, the movement itself creates additional information that is converted back to the road obstacle image 222 for the continued operation of the navigation system 500 and to continue the movement in the physical world.

The software 312 of FIG. 3 can include the navigation system 500. For example, the software 312 can include the image receiver module 508, the navigation module 506, and the display module 520.

The entry module 502 can represent the user interface 302 of FIG. 3. The entry 204 can be entered or selected into the user interface 302. The control unit 308 of FIG. 3 can execute the software 312 for the navigation module 506 to receive the entry 204 from the entry module 502. The control unit 308 can also execute the software 312 to operate the communication unit 310 of FIG. 3 and the location unit 306 of FIG. 3.

The control unit 308 of FIG. 3 can execute the software 312 for the image capturing device 220 to capture the road obstacle image 222, the target destination image 224, or the combination thereof. The control unit 308 of FIG. 3 can execute the software 312 for the image capturing device 220 to send the road obstacle image 222, the target destination image 224, or the combination thereof to the image receiver module 508.

The control unit 308 can execute the software 312 for the image receiver module 508 to send the road obstacle image 222, the target destination image 224, or the combination thereof to the navigation module 506. The control unit 308 can execute the software 312 for the navigation module 506 to receive the road obstacle image 222 and the target destination image 224 from the image receiver module 508.

The software 312 can be executed to generate the operation directions 226, the route 210, the destination image 236, and the sub-destination image 238. The control unit 308 can execute the software 312 to execute the navigation module 506, the guidance generator module 516, the image management module 512, and the route generator module 522. The control unit 308 can execute the software 312 to generate the route 210 based on the entry 204. The control unit 308 can execute the software 312 to generate the operation directions 226 based on the road obstacle image 222. The control unit 308 can generate the destination image 236 and the sub-destination image 238 based on the target destination image 224. The operation directions 226, the route 210, the destination image 236, and the sub-destination image 238 can be displayed on the display interface 202.

The navigation system 500 can be partitioned between the first device 402 of FIG. 4 and the second device 406 of FIG. 4. For example, the navigation system 500 can be partitioned into the functional units of the first device 402, the second device 406, or a combination thereof. The navigation system 500 can also be implemented as additional functional units in the first device 102 of FIG. 1, the first device 402, the second device 406, or a combination thereof.

As another example, the navigation system 500 can be partitioned between the first software 426 of FIG. 4 and the second software 442 of FIG. 4. For example, the second software 442 can include the navigation module 506. The second control unit 434 of FIG. 4 can execute modules partitioned on the second software 442.

The first software 426 can include the image receiver module 508, the entry module 502, and the display module 520. Based on the size of the first storage unit 414 of FIG. 4, the first software 426 can include additional modules of the navigation system 500. The first control unit 412 of FIG. 4 can execute the modules partitioned on the first software 426.

The entry 204 can be entered into the first user interface 418 of FIG. 4. The road obstacle image 222, the target destination image 224, or the combination thereof can be captured into the first storage interface 424 of FIG. 4. The first control unit 412 can operate the first communication unit 416 of FIG. 4 to send the entry 204, the road obstacle image 222, the target destination image 224, or the combination thereof to the second device 406.

The second communication unit 436 of FIG. 4 can send the operation directions 226, the route 210, the destination image 236, the sub-destination image 238, or the combination thereof to the first device 402 through the communication path 404 of FIG. 4. The operation directions 226, the route 210, the destination image 236, the sub-destination image 238, or the combination thereof can be displayed on the first display interface 430 of FIG. 4. The operation directions 226, the route 210, the destination image 236, the sub-destination image 238, or the combination thereof can be displayed on the second device 106 of FIG. 1.

It has been discovered that the present invention provides the navigation system 500 for generating the operation directions 226 based on the navigation system 500 receiving the road obstacle image 222 to aid the user for operating the vehicle to travel along the travel path safely. The navigation system 500 generating the road obstacle image 222 and the warning 234 enhances the ability of the user to identify the existence and the nature of the road obstacle 212. The navigation system 500 generating the operation directions 226 based on the tracking tag 218 improves the efficiency of the user traveling along the route 210 to reach the destination 206. The navigation system 500 generating the destination image 236 and sub-destination image 238 aids the user by accurately identifying the location where the user desires to reach. The navigation system 500 generating the route 210 to reach not only the destination 206, but also the sub-destination 208 aids the user for reaching the target destination safely.

The navigation system 500 describes the module functions or order as an example. The modules can be partitioned differently. For example, the guidance generator module 516 and the route generator module 522 can be combined. Each of the modules can operate individually and independently of the other modules.

Figure 6:
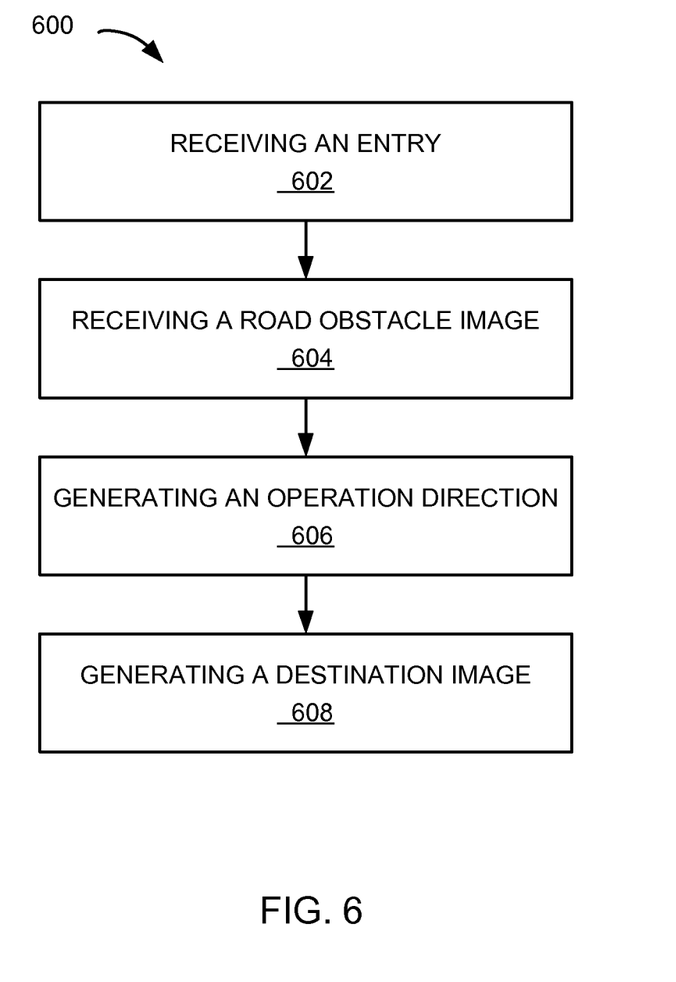
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: receiving an entry for a destination, a sub-destination, or a combination thereof with the sub-destination located within the destination in a block 602; receiving a road obstacle image while traveling along a route to reach the destination in a block 604; generating an operation direction based on the road obstacle image in a block 606; and generating a destination image representing the destination for displaying on a device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    receiving an entry for a destination, a sub-destination, or a combination thereof with the sub-destination located within the destination;
    receiving a road obstacle image while traveling along a route to reach the destination;
    generating an operation direction based on the road obstacle image for recommending to change lane due to a road obstacle representing a type of object determined as hazardous from the road obstacle image;
    receiving the road obstacle image recaptured for determining the same instance of the road obstacle representing another type of object as no longer hazardous;
    updating the operation direction based on the road obstacle image recaptured for notifying a change of lane is no longer recommended;
    generating a destination image, with a control unit, representing the destination for displaying with the operation direction on a device; and
    generating a sub-destination image based on the destination image for identifying the sub-destination.

2. The method as claimed in claim 1 wherein generating the operation direction includes generating a warning based on the road obstacle image for maneuvering around the road obstacle while traveling along the route.

3. The method as claimed in claim 1 wherein generating the sub-destination image includes generating the sub-destination image based on the destination image for displaying on the device.

4. The method as claimed in claim 1 further comprising:
    generating the route to reach the destination; and
    updating the operation direction for maneuvering around the road obstacle represented by the road obstacle image.

5. The method as claimed in claim 1 wherein receiving the road obstacle image includes receiving the road obstacle image for representing the road obstacle encountered while traveling along the route.

6. A method of operation of a navigation system comprising:
    receiving an entry for a destination, a sub-destination, or a combination thereof with the sub-destination located within the destination;
    generating a route to reach the destination;
    receiving a road obstacle image for representing a road obstacle encountered while traveling along the route;
    generating an operation direction based on the road obstacle image for maneuvering around the road obstacle representing a type of object determined as hazardous while traveling along the route for recommending to change lane;
    receiving the road obstacle image recaptured for determining the same instance of the road obstacle representing another type of object as no longer hazardous;
    updating the operation direction based on the road obstacle image recaptured for notifying a change of lane is no longer recommended;
    generating a destination image, with a control unit, of the destination for displaying with the operation direction on a device; and
    generating a sub-destination image based on the destination image for identifying the sub-destination.

7. The method as claimed in claim 6 wherein generating the operation direction includes generating the operation direction based on the road obstacle image for representing a traffic controller for aiding a user for traveling along the route.

8. The method as claimed in claim 6 wherein generating the operation direction includes generating the operation direction based on a tracking tag for indicating the distance between a moving obstacle and a user's vehicle.

9. The method as claimed in claim 6 further comprising:
    receiving a target destination image; and
    wherein:
        generating the route to reach the destination includes generating the route based on the target destination image for reaching the sub-destination; and
        generating the operation direction includes generating the operation direction based on the target destination image for aiding the user to reach the sub-destination.

10. The method as claimed in claim 6 wherein receiving the road obstacle image includes receiving the road obstacle image for representing a moving obstacle while traveling along the route.

11. A navigation system comprising:
    an user interface for receiving an entry for a destination, a sub-destination, or a combination thereof with the sub-destination located within the destination; and
    a control unit, coupled to the user interface, for:
        receiving a road obstacle image while traveling along a route to reach the destination, generating an operation direction based on the road obstacle image for recommending to change lane due to a road obstacle representing a type of object determined as hazardous from the road obstacle image, receiving the road obstacle image recaptured for determining the same instance of the road obstacle representing another type of object as no longer hazardous, updating the operation direction based on the road obstacle image recaptured for notifying a change of lane is no longer recommended, generating a destination image representing the destination for displaying with the operation direction on a device, and generating a sub-destination image based on the destination image for identifying the sub-destination.

12. The system as claimed in claim 11 wherein the control unit is for generating a warning based on the road obstacle image for maneuvering around the road obstacle while traveling along the route.

13. The system as claimed in claim 11 wherein the control unit is for generating the sub-destination image based on the destination image for displaying on the device.

14. The system as claimed in claim 11 wherein the control unit is for:

generating the route to reach the destination; and maneuvering around the road obstacle represented by the road obstacle image.

15. The system as claimed in claim 11 wherein the control unit is for receiving the road obstacle image for representing the road obstacle encountered while traveling along the route.

16. The system as claimed in claim 11 wherein the control unit is for:

generating the route to reach the destination;

receiving the road obstacle image for representing the road obstacle encountered while traveling along the route; and generating the operation direction based on the road obstacle image for maneuvering around the road obstacle while traveling along the route.

17. The system as claimed in claim 16 wherein the control unit is for generating the operation direction based on the road obstacle image for representing a traffic controller for aiding a user for traveling along the route.

18. The system as claimed in claim 16 wherein the control unit is for generating the operation direction based on a tracking tag for indicating the distance between a moving obstacle and a user's vehicle.

19. The system as claimed in claim 16 wherein the control unit is for:

receiving a target destination image; and generating the route based on the target destination image to reach the sub-destination; and generating the operation direction based on the target destination image for aiding the user to reach the sub-destination.

20. The system as claimed in claim 16 wherein the control unit is for receiving the road obstacle image for representing a moving obstacle while traveling along the route.

* * * * *